Sept. 23, 1958 W. E. RENICK 2,852,948
SOLENOID OPERATED VALVE
Filed Nov. 14, 1952 3 Sheets-Sheet 1

INVENTOR.
WENDELL E. RENICK
BY
Herschel C. Omohundro
attorney

Sept. 23, 1958 W. E. RENICK 2,852,948
SOLENOID OPERATED VALVE
Filed Nov. 14, 1952 3 Sheets-Sheet 2

INVENTOR.
WENDELL E. RENICK
BY
Herschel C. Omohundro
attorney

Sept. 23, 1958 W. E. RENICK 2,852,948
SOLENOID OPERATED VALVE

Filed Nov. 14, 1952 3 Sheets-Sheet 3

INVENTOR.
WENDELL E. RENICK
BY
*Herschel C. Omohundro*
  *attorney*

United States Patent Office 2,852,948
Patented Sept. 23, 1958

2,852,948

SOLENOID OPERATED VALVE

Wendell E. Renick, Columbus, Ohio, assignor, by mesne assignments, to American Brake Shoe Company, New York, N. Y., a corporation of Delaware Application November 14, 1952, Serial No. 320,416

4 Claims. (Cl. 74—110)

This invention relates generally to control valves for use in hydraulic systems and is particularly directed to solenoid-controlled, pilot operated valves.

An object of this invention is to provide improved means for transmitting motion from the movable armature of a solenoid to the pilot valve employed to control the flow of fluid under pressure to effect the actuation of the main valve spool.

Another object is to provide a motion transmitting mechanism of the type mentioned in the preceding paragraph with means for absorbing excess motion of the solenoid armature after the pilot valve actuated thereby has been seated.

Another object is to provide motion transmitting means having a lever engaging the armature of a solenoid at one end and a pilot valve-contacting pushrod at the other end and pivotal means for supporting the lever, the supporting means being capable of movement in a direction substantially parallel to the direction of movement of the solenoid and pushrod.

A still further object of the invention is to provide the motion transmitting means mentioned in the preceding paragraph with resilient means for yieldably resisting the movement of the pivotal supporting means for the lever.

Further objects and advantages of the present invention will be apparent from the following description, reference being had to the accompanying drawings wherein a preferred form of embodiment of the invention is clearly shown.

Figure 1:
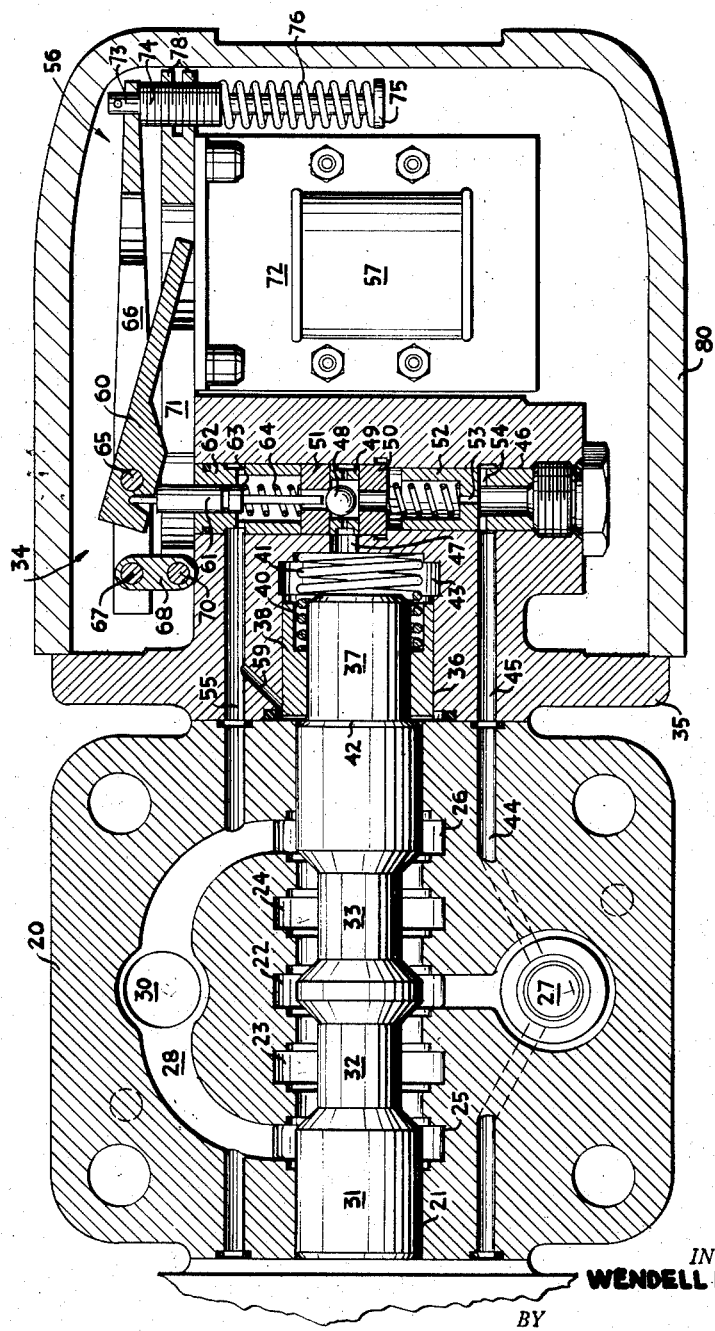
Fig. 1 is a vertical longitudinal sectional view taken through a valve with a solenoid operated actuating means formed in accordance with the present invention provided thereon, the solenoid being de-energized and the spool of the valve being in a centered position.

Referring more particularly to the drawings, the numeral 20 designates the casing of a four-way valve. The casing 20 of this valve includes a longitudinally extending bore 21 which intersects a plurality of chambers 22 to 26, inclusive, the chambers being spaced longitudinally of the casing 20. Chamber 22 constitutes the inlet chamber and is connected with an inlet passage or port 27 communicating with a source of fluid pressure (not shown). Chambers 25 and 26 are disposed adjacent the ends of the bore 21 and are connected by a curved passage 28 which is also connected with an exhaust port 30. Chambers 23 and 24 are disposed between the inlet chamber 22 and exhaust chambers 25 and 26, chambers 23 and 24 being connected by suitable passages, not shown, with forward and reverse motor parts.

This invention is directed to means for actuating a spool 31 which is disposed for sliding movement in the bore 21. The spool has a plurality of external grooves 32 and 33 formed therein to establish communication between certain sets of the ports 22 to 26, inclusive, depending upon the different positions of rest of the spool 31. The actuating mechanism, designated generally by the numeral 34, is arranged in an end casting 35 which is suitably secured to the end of the casing 20. This end casting has a chamber 36 disposed in registration with the bore 21, the chamber 36 receiving an extension 37 of the spool 31 and a sleeve-like piston member 38, this piston member surrounding the extension 37. The piston 38 is counterbored, as at 40, to receive one end of a coil spring 41, the other end of this spring being disposed in a socket formed in the casting 35. This spring urges the piston 38 toward the casing 20, the movement of the piston in this direction being limited through its engagement with the end of the casing 20. This piston also engages a shoulder 42 formed on the spool 31. Only one end of the valve has been illustrated since it is obvious that the opposite end of the valve could be provided with a mechanism identical to that shown at 34. It should be obvious also that such a mechanism could be provided only at one end if the requirements of the valve so dictated. The spool illustrated is movable in either direction from the position shown in Fig. 1. It is urged to this position by the coil spring 41 and a similar spring, not shown, at the opposite end. When the spool is in this position, the inlet and outlet ports are connected by the grooves 32 and 33; the valve is said to be in a "centered" position and of the open center type.

Figure 2:
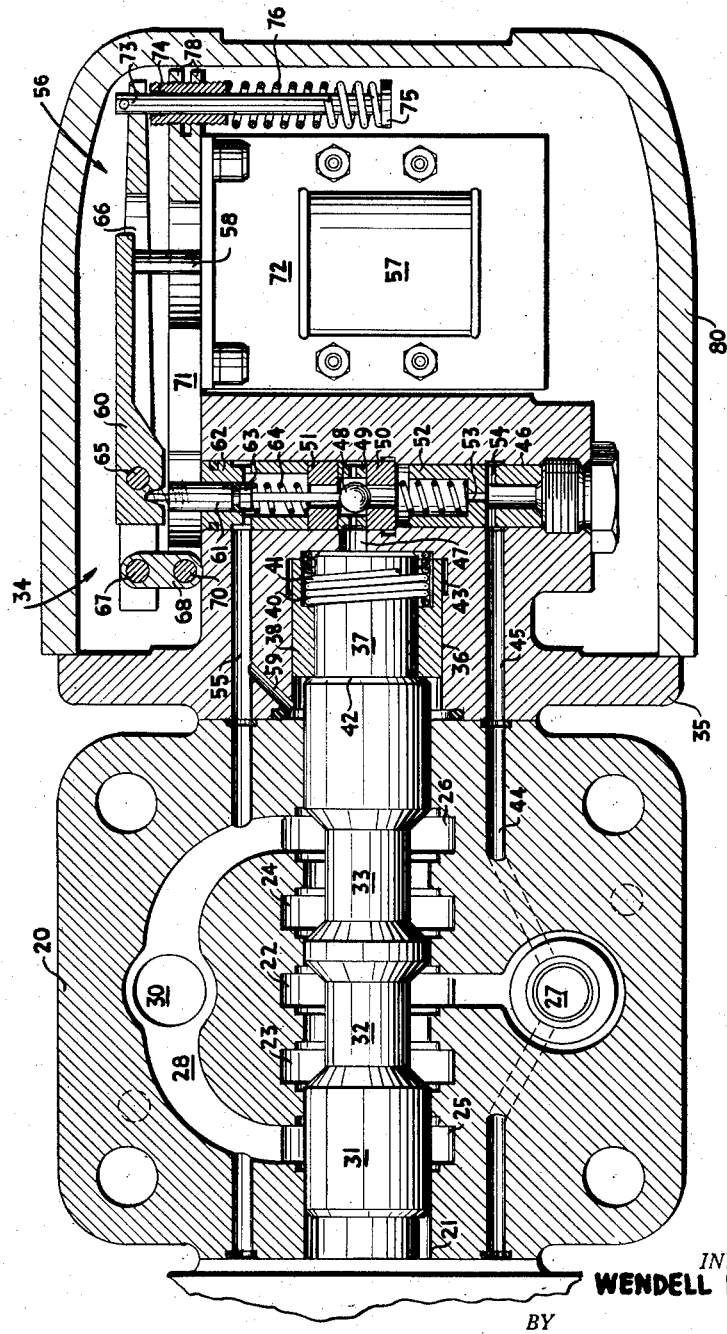
Fig. 2 is a similar view with the solenoid energized and the valve spool moved to the right.
Figure 3:
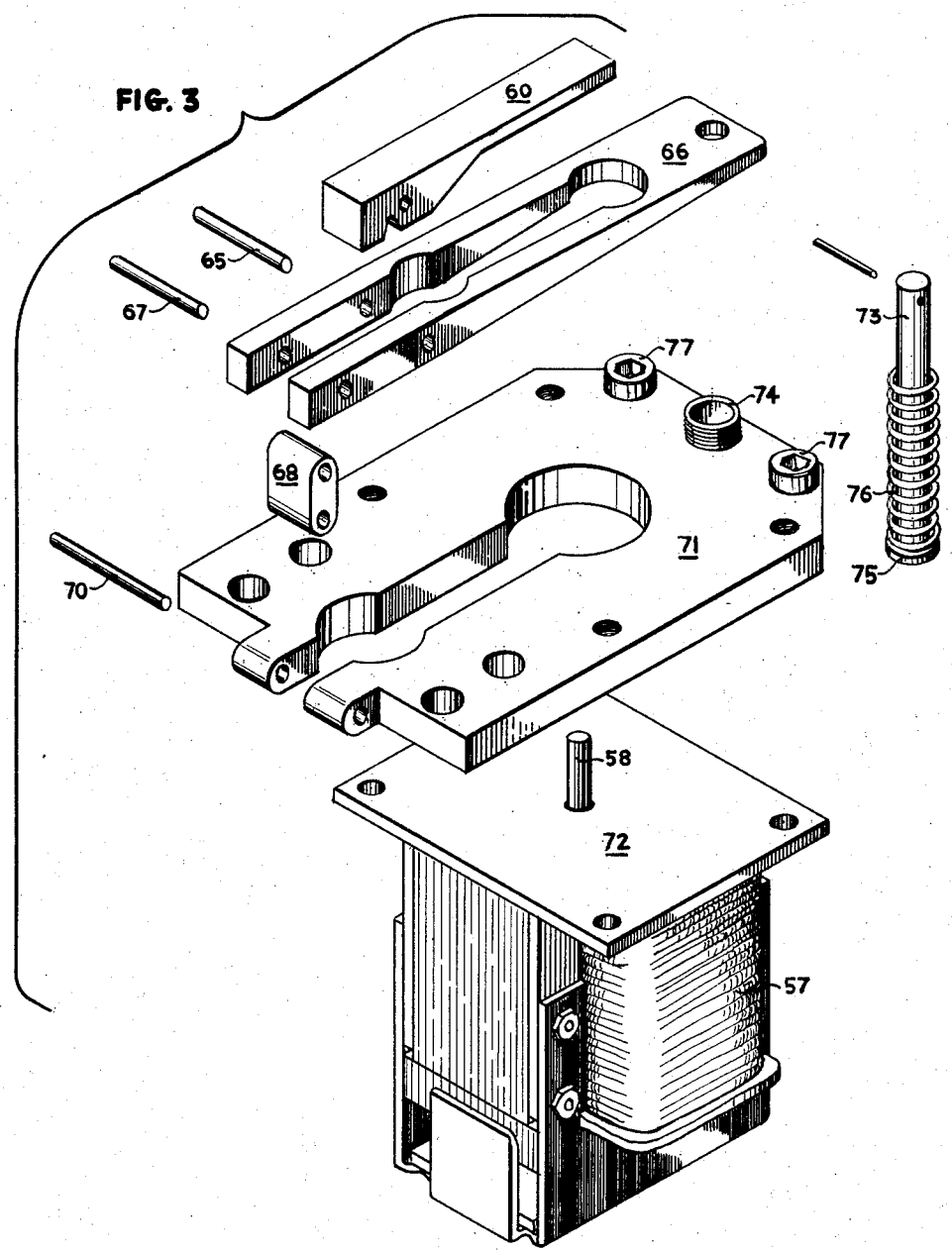
Fig. 3 is an exploded perspective view of the actuating means for the valve shown in Fig. 1.

The mechanism 34 is provided to assist in effecting the movement of the spool 31 from the position shown in Fig. 1 to positions at the right and left thereof. In a position at the left, groove 33 will establish communication between chamber 22 and chamber 24 while groove 32 will establish communication between chamber 23 and exhaust chamber 25. These chamber relations will be reversed when the spool is moved to a position at the right of the centered position as illustrated in Fig. 2. The spool is moved by the application of fluid under pressure to one end and the connection of the space at the opposite end with exhaust. The mechanisms 34 are provided to effect these operations.

As shown in the drawings, the mechanism 34 controls the admission of pressure fluid to and the escape thereof from a chamber 43 at the end of spool extension 37 and piston 38. Fluid is admitted from the inlet port 27 through passages 44 and 45 formed in casing 20 and casting 35, bore 46 and port 47 formed in registration with the chamber 43. The flow of fluid to and from chamber 43 is controlled by a ball valve 48 which is disposed in a cage 49 located between valve seat inserts 50 and 51. The bore 46 receives for sliding movement a flow control spool 52 in which an orifice 53 and lateral ports 54 are formed. This orifice restricts the flow of fluid from the inlet port 27 to the chamber 43 and creates a pressure differential at opposite ends of the spool 52. The higher pressure of this differential tends to move spool 52 toward the valve assembly 48—51 in opposition to a coil spring. This movement changes the relation of port 54 and pressure passage 45 decreasing the communication therebetween and retarding the movement of the spool. When fluid flow through the orifice 53 is discontinued, spool 52 returns to the position shown. It will be noted that the port 47 communicates with the bore 46 at a point between the valve seat inserts 50 and 51. Bore 46 is also connected by a passage 55 with the curved passage 28 which communicates with the exhaust port 30. When the ball valve 48 is in engagement with the valve seat 50, as illustrated in Fig. 2, the chamber 43 at the end of the valve spool is connected by port 47, bore 46 and passage 55 with the exhaust port 30. When the ball valve 48 engages valve seat 51, as shown in Fig. 1, the chamber 43 is connected by port 47, bore 46 and passages 45 and 44 with the fluid pressure inlet port 27.

When the system, in which the valve shown, is in operation but the valve is idle, the spool 31 is held in its centered position, as shown in Fig. 1, by the combined forces of the springs 41 and the fluid pressure in the chambers 43 at both ends of the spool. The fluid has access to the chambers 43 because the ball valves 48 are disengaged from the seats 50 and communication is thus established between the inlet port 27 and the chambers 43. When it is desired to move the spool 31 toward either end of the casing, the ball valve 48 at such end, for example, the right end, is moved away from its seat 51 and engaged with its seat 50 as shown in Fig. 2. This action connects the adjacent chamber 43 with the exhaust port and the fluid pressure in the chamber 43 at the other end may then move the spool toward the right to the selected position. In so moving, the spool will push the piston 38 into the chamber 43 and expel the fluid therein to exhaust. A branch passage 59 extending from passage 55 to the end of chamber 36 permits fluid to flow into the space vacated by the piston 38 and prevents the creation of sub-atmospheric pressure which would oppose the movement of the piston 38. The movement of the piston in this manner compresses the spring 41 at the respective end of the spool. When the ball valve 48 previously disengaged from its seat 51 is re-engaged with such seat the spool extension and surrounding piston 38 will again be exposed to fluid pressure from port 27. Since the piston 38 at the opposite end could not follow the spool in moving toward the right due to its engagement with the end of casing 20, the ends of the spool are exposed to unequal forces from the fluid pressure plus the force of the compressed spring 41. These forces will cause the spool to return to the centered position. Each ball valve 48 is moved away from seat 51 by a solenoid operated mechanism 56.

This mechanism includes the solenoid field winding 57, an armature 58 disposed for movement within the field coil, a lever 60 having one end in the path of movement of the armature 58 and the other end in engagement with a pushrod 61, this pushrod being guided for movement in the bore 46 by a sleeve 62. The pushrod is reduced, as at 63, to provide a shoulder which is engaged by a coil spring 64 also engaged with the valve seat insert 51. Coil spring 64 tends to move the pushrod 61 away from the ball valve 48. The outer end of the pushrod engages the lever 60 and is located in a recess formed therein. The lever 60 is disposed for rocking movement about a pivot 65 extending through the lever 60 adjacent to the point engaged by the pushrod 61.

This location of the pivot provides a desirable leverage ratio which will permit considerable movement of the armature 58 and relatively slight movement of the ball valve 48. It will also permit the use of a smaller solenoid with minimum power requirements. The pivot 65 is supported for limited movement in a direction parallel to the direction of movement of the pushrod and armature. This pivot extends through the lever 60 and into the forked ends of a second lever 66. This second lever is also pivotally mounted, as at 67, on one end of a connecting link 68, the other end of this link being pivoted, as at 70, on a mounting plate 71. Plate 71 is rigidly secured to the casting 35 and in turn supports the framework 72 of the solenoid 57. The pivotal mounting for the lever 66 is also located adjacent the pushrod 61 on the opposite side thereof from the pivot 65, the lever 66 being pivotally connected at one end. The other end of the lever is connected with a pin 73 which is slidably supported in an adjusting sleeve 74, the pin 73 having a head 75 at the end remote from the lever 66.

The coil spring 76 is disposed between the head 75 and the adjusting sleeve 74. This coil spring tends to maintain the lever 66 in engagement with the sleeve 74 but permits the lever 66 to swing slightly away from the sleeve on the pivot 67. When the lever 66 moves in this direction, the pivot 65 and lever 60 will also move. Movement in this direction occurs after the solenoid has been energized and the armature has moved a distance sufficient to cause the ball valve 47 to engage the seat 50. Any additional movement of the armature 58 will cause the lever 60 to pivot about the end of the pushrod 61 transmitting movement to the pivot 65 and through this member to the lever 66. The armature will thus be permitted to move to the full extent necessary to prevent vibration and undue deterioration of the solenoid. When the solenoid field coil is de-energized, lever 66 will return to the position shown and the spring 64 will rock the lever 60 about the pivot 65 to return armature 58 to its inactive position. When this solenoid is de-energized in this manner, fluid pressure under the ball valve 47 will lift the ball from the seat 50 and move it into engagement with seat 51.

It will be obvious that the formation of the motion transmitting mechanism between the solenoid and the pushrod, in the manner illustrated, will permit limited movement of the pivot 65 for the lever 60 and the excess movement of the armature 58 will be absorbed. The position of the adjustable sleeve 74 is maintained through the actuation of a pair of screws 77 which squeeze the slotted ends 78 of the plate 71 together and bind the threads of the sleeve. A suitable cover 80 protects the actuating mechanism 34.

While the form of embodiment of the present invention as herein disclosed constitutes a preferred form, it is to be understood that other forms might be adopted, all coming within the scope of the claims which follow.

I claim:

1. Valve actuating means comprising a solenoid having a movable armature; a valve contacting push-rod guided for movement parallel to said armature; a lever engaging said push-rod and armature; a pivot for said lever between said push-rod and said armature; means supporting said pivot for limited movement in a direction parallel to the path of movement of said armature and push-rod, said means having a second lever pivotally supported at one side of said push-rod; and resilient means at the opposite side of said armature from said push-rod engaging said second lever and yieldably resisting movement thereof.

2. Valve actuating means comprising a solenoid having a movable armature; a valve contacting push-rod guided for movement parallel to said armature; means for transmitting motion from said armature to said push-rod having first and second substantially parallel levers; a pivotal support for the first of said levers; resilient means resisting movement of said first lever; and means pivotally connecting the second lever to the first at a point between said armature and push-rod, said second lever engaging said armature and push-rod.

3. A valve operating mechanism adapted to press a valve element upon a seat, said mechanism including a solenoid having a movable armature; a valve operating means; a lever interconnecting said armature and said valve operating means; a pivot for said lever, and means including a spring for holding the axis of said pivot in a fixed position until said armature has pressed said valve element upon said seat and thereafter yielding to permit said pivot axis to move to permit further movement of said armature.

4. In a valve, operating mechanism adapted to move a valve element upon said second seat, said mechanism including a solenoid having a movable armature; a valve operating means; a lever interconnecting said armature and said valve operating means; a pivot for said lever, and means including a spring for holding the axis of said pivot in a fixed position until said armature has pressed said valve element upon said second seat and thereafter yielding to permit said pivot axis to move to permit further movement of said armature.

References Cited in the file of this patent

UNITED STATES PATENTS

| | | |
|---|---|---|
| 1,481,951 | Asbury | Jan. 29, 1924 |
| 2,300,263 | McLeod | Oct. 27, 1942 |
| 2,331,942 | Turnbull | Oct. 19, 1943 |
| 2,473,038 | Rockwell | June 14, 1949 |
| 2,523,660 | Hulstein | Sept. 26, 1950 |